United States Patent [19]

Köhler et al.

[11] Patent Number: 4,978,729

[45] Date of Patent: Dec. 18, 1990

[54] HIGH MOLECULAR WEIGHT POLYARYLENE SULFIDE PRODUCED FROM POLYARYLENE SULFIDE AND AROMATIC DIHALOGEN COMPOUND

[75] Inventors: Burkhard Köhler; Hans-Detlef Heinz, both of Krefeld, Fed. Rep. of Germany

[73] Assignee: Bayer Aktiengesellschaft, Leverkusen, Fed. Rep. of Germany

[21] Appl. No.: 390,229

[22] Filed: Aug. 7, 1989

[30] Foreign Application Priority Data

Aug. 18, 1988 [DE] Fed. Rep. of Germany ....... 3828058

[51] Int. Cl.$^5$ .............................................. C08G 75/16
[52] U.S. Cl. .................................... 525/537; 528/388

[58] Field of Search .................... 525/537; 528/388

[56] References Cited

U.S. PATENT DOCUMENTS 3,395,132 7/1968 Smith .................................. 525/537
4,645,826 2/1987 Iizuka et al. ....................... 525/537

*Primary Examiner*—Harold D. Anderson
*Attorney, Agent, or Firm*—Connolly and Hutz

[57] ABSTRACT

The invention relates to high molecular weight polyarylene sulfides (PAS), preferably polyphenylene sulfides (PPS), produced from polyarylene sulfides, preferably polyphenylene sulfide and aromatic dihalogen compounds.

4 Claims, No Drawings

HIGH MOLECULAR WEIGHT POLYARYLENE SULFIDE PRODUCED FROM POLYARYLENE SULFIDE AND AROMATIC DIHALOGEN COMPOUND

This invention relates to high molecular weight polyarylene sulfides (PAS), preferably polyphenylene sulfides (PPS), produced from polyarylene sulfides, preferably polyphenylene sulfide, and aromatic dihalogen compounds.

Polyarylene sulfides are known (cf. for example U.S. Pat. No. 3,354,129, EP-OS No. 171 021). They are inert, high-temperature-resistant thermoplastics which, in addition, can be filled to a high level with glass fibers and/or other organic fillers. The use of these polymers, particularly polyparaphenylene sulfide (PPS), is increasing above all in applications which have hitherto been reserved for duroplastics.

One disadvantage of PAS can be unsatisfactory toughness which may increase with increasing melt viscosity. The rapid crystallization of PAS can also be a disadvantage for many applications, including for example the production of films. The tendency towards rapid crystallization is also lower in polyarylene sulfides of high melt viscosity.

It has now been found that selected dihalogen compounds are very suitable, when incorporated in PAS melts, preferably PPS melts, for producing a readily controllable increase in melt viscosity and good crystallization behavior of the polymers.

Accordingly, the present invention relates to high molecular weight polyarylene sulfides, preferably polyphenylene sulfides, produced by reaction of known polyarylene sulfides, preferably polyphenylene sulfide, with dihalogen compounds corresponding to formula (I)

Hal—R—Hal    (I)

in which

R represents $C_6$–$C_{22}$ alkylene, preferably hexamethylene, $C_6$–$C_{22}$ cycloalkylene, $C_6$–$C_{22}$-bis-(halomethyl)-arylene, the arylene radical preferably being an m- or p-phenylene radical or a 1,4-, 1,5-, 1,6-, 1,7-, 1,8-, 2,6- or 2,7-naphthylene radical, and the arylene radicals optionally bearing $C_1$–$C_6$ alkyl, preferably methyl, halo (for example Cl, Br) methyl, $C_6$–$C_{22}$ aryl, preferably phenyl or halogen (for example Cl, Br) substituents and Hal represents fluorine, chlorine, bromine or iodine, perferably chlorine.

Examples of dihalogen compounds corresponding to formula (I) are aliphatic or aromatic dihalogen compounds, e.g. p-xylylene dichloride, m-xylylene dichloride, 2,4-(dichloromethyl)-1,5-dimethyl benzene, 1,6-dichlorohexane, 1,12-dichlorododecane, 1,2,3-, 1,2,4- and 1,3,5-tri-(chloromethyl)-benzene, 1,6- and 2,6-di-(chloromethyl)-naphthalene and the corresponding bromine compounds. They may be used individually or in admixture.

According to the invention, the polyarylene sulfides, preferably polyphenylene sulfides, are prepared by melting a mixture of polyarylene sulfide with 3 to 30% by weight and preferably 5 to 20% by weight dihalogen compound corresponding to formula I in (screw) extruders, kneaders, etc.

The aftertreatment time in the melt is between 0.5 and 500 minutes and preferably between 5 and 60 minutes.

A suitable temperature for the aftertreatment according to the invention in the melt is in the range from 280° to 450° C. and preferably in the range from 300° to 360° C.

In one particular embodiment, moldings of the polyarylene sulfides to be used in accordance with the invention may even be aftertreated in solid phase with dihalogen compounds of formula (I) at temperatures in the range from 150° to 270° C.

The process according to the invention may be carried out in an inert gas atmosphere (for example nitrogen, argon), optionally in a vacuum of up to $10^{-6}$ bar. The process according to the invention is preferably carried out in an inert gas atmosphere.

The polyarylene sulfides produced in accordance with the invention may be processed by injection molding or extrusion to form molded articles, fibers or films.

EXAMPLE 1

1 g 2,4-(dichloromethyl)-1,5-dimethyl benzene is added to 10 g paraphenylene sulfide having a melt viscosity of 44 Pas (at 306° C./1000 $s^{-1}$), followed by heating for 1 h to 310° C. The resulting polyarylene sulfide has a melt viscosity of 22,000 Pas.

EXAMPLE 2

0.7 g 2,4-(dichloromethyl)-1,5-dimethyl benzene is added and the mixture heated for 30 minutes to 310° C. The resulting polyarylene sulfide has a melt viscosity of 470 Pas.

EXAMPLE 3

0.5 g 2,4-(dichloromethyl)-1,5-dimethyl benzene is added and the mixture heated for 10 minutes to 310° C. The resulting polyarylene sulfide has a melt viscosity of 68 Pas.

EXAMPLE 4

0.7 g 1,6-dichlorohexane is added and the mixture heated for 30 minutes to 310° C. The resulting polyarylene sulfide has a melt viscosity of 200 Pas.

We claim:

1. High molecular weight polyarylene sulfide produced by reaction of polyarylene sulfide with at least one diahalogen compound corresponding to formula (I)

Hal—R—Hal    (I)

in which:

R represents $C_6$–$C_{22}$ alkylene, $C_6$–$C_{22}$ cycloalkylene or bis-(halomethyl)-arylene; the arylene radical is an m- or p- phenylene radical, or a 1,4-, 1,5-, 1,6-, 1,7-, 1,8-, 2,6- or 2,7-naphthylene radical wherein the arylene radical is optionally substituted with $C_1$–$C_6$ alkyl, halomethyl, $C_6$–$C_{22}$ aryl or halogen substituents, and Hal represents fluorine, chlorine, bromine or iodine.

2. A process for the production of high molecular weight polyarylene sulfide as claimed in claim 1, comprising melting polyarylene sulfide together with at least one dihalogen compound corresponding to formula (I).

Hal—R—Hal    (I)

in which R and Hal are as defined in claim 1.

3. A molded article of the high molecular weight polyarylene sulfide of claim 1.

4. A high molecular weight polyarylene sulfide as claimed in claim 1, wherein the polyarylene sulfide is polyphenylene sulfide.

* * * * *